(12) United States Patent
Iten (10) Patent No.: US 10,444,536 B2
(45) Date of Patent: Oct. 15, 2019

(54) ONE-HAND OPERATED GLASSES

(71) Applicant: Roland Iten Mechanical Luxury S.A., Mont-sur-Lausanne (CH)

(72) Inventor: Roland Iten, Mont-sur-Lausanne (CH)

( * ) Notice: Subject to any disclaimer, the term of this patent is extended or adjusted under 35 U.S.C. 154(b) by 0 days.

(21) Appl. No.: 15/109,134

(22) PCT Filed: Jan. 13, 2015

(86) PCT No.: PCT/IB2015/050249
§ 371 (c)(1),
(2) Date: Jun. 30, 2016

(87) PCT Pub. No.: WO2015/104697
PCT Pub. Date: Jul. 16, 2015

(65) Prior Publication Data
US 2016/0327807 A1    Nov. 10, 2016

(30) Foreign Application Priority Data

Jan. 13, 2014 (CH) ........................................ 0027/14
Apr. 9, 2014 (CH) ........................................ 0548/14

(51) Int. Cl.
*G02C 5/22* (2006.01)
*G02C 5/00* (2006.01)
*G02C 5/16* (2006.01)
*G02C 5/14* (2006.01)

(52) U.S. Cl.
CPC ........... *G02C 5/2263* (2013.01); *G02C 5/001* (2013.01); *G02C 5/14* (2013.01); *G02C 5/16* (2013.01)

(58) Field of Classification Search
CPC .......... G02C 5/02; G02C 5/04; G02C 5/2263; G02C 5/10; G02C 5/146; G02C 5/2209; G02C 5/2236; G02C 5/2245; G02C 5/2272
USPC .......... 351/63, 113, 121, 128, 133, 140, 153
See application file for complete search history.

(56) References Cited

U.S. PATENT DOCUMENTS 3,713,732 A * 1/1973 Gooch ..................... G02C 1/04
351/116
4,820,035 A * 4/1989 Kanda .................... G02C 5/006
351/113
5,426,473 A * 6/1995 Riehm .................... A61F 9/026
2/449

(Continued)

FOREIGN PATENT DOCUMENTS

DE          1215956 B1    5/1966
WO     WO02071129 A1    9/2002

(Continued)

OTHER PUBLICATIONS

International Search Report of PCT/IB2015/050249 dated Apr. 24, 2015.

(Continued)

*Primary Examiner* — Nicholas R. Pasko
(74) *Attorney, Agent, or Firm* — Andre Roland S.A.; Nikolaus Schibli (57) ABSTRACT

The glasses, such as spectacles, comprise at least a frame (20) and two arms (30) that are mounted on said frame via hinge units (50). The glasses further comprise a movable element (60) on said frame that generates the folding and unfolding of both said arms together with one single hand.

8 Claims, 12 Drawing Sheets

(56) References Cited

U.S. PATENT DOCUMENTS

| | | | | | |
|---|---|---|---|---|---|
| 5,631,719 | A | * | 5/1997 | Chao | G02C 5/008 16/228 |
| 5,764,336 | A | * | 6/1998 | Porsche | G02C 5/2254 16/228 |
| 6,776,484 | B2 | * | 8/2004 | Tribuiani | G02C 5/2227 16/228 |
| 7,344,242 | B2 | * | 3/2008 | Habermann | G02C 1/08 16/228 |
| 8,857,980 | B2 | * | 10/2014 | Wang | G02C 5/06 351/63 |

FOREIGN PATENT DOCUMENTS

| | | | | | |
|---|---|---|---|---|---|
| WO | WO 2015107441 | A1 | * | 7/2015 | G02C 5/001 |
| WO | WO-2015107441 | A1 | * | 7/2015 | G02C 5/001 |

OTHER PUBLICATIONS

Written Opinion of the International Search Authority dated Apr. 24, 2015.

* cited by examiner

ONE-HAND OPERATED GLASSES

CROSS REFERENCE TO RELATED APPLICATIONS

The present application is a U.S. national stage application of PCT/IB2015/050249 filed on Jan. 13, 2015, and claims foreign priority to earlier Swiss patent applications N° 00027/14 filed on Jan. 13, 2014 and N° 00548/14 filed on Apr. 9, 2014, said three earlier applications being incorporated in their entirety by reference in the present application.

TECHNICAL FIELD

The present invention concerns the field of glasses or spectacles that are used to help vision of a wearer or protect his vision against the light (such as sunlight), identified in the present application with the generic word of "glasses".

More specifically, the present invention concerns glasses that can be manipulated with one single hand by the wearer to open the temples (or arms).

BACKGROUND ART

Glasses and spectacles are well known in the art and they all suffer from the same drawback: when a user wishes to wear the glasses, he/she needs both hands to unfold the arms from their folded position (which is used when the glasses/spectacles are stored).

This can be difficult when the user does not permanently wear his glasses and is occupied with at least one hand, for example when driving a car or holding a phone, and the user needs his glasses because of the sunlight (while driving) or if he wants to read a text message received on his phone or the name of a caller.

SUMMARY OF THE INVENTION

Accordingly, there is a need to provide a simple system that allows a user to unfold the arms of his glasses with one single hand in a simple manner.

To this effect, the present invention provides means that allow overcoming the drawbacks of the glasses of the prior art and unfolding of the arms of the glasses with a single hand. Embodiments of the invention are defined in the following detailed description and in the appended claims.

The present invention also relates to a method for unfolding the arms of the glasses as described herein.

Embodiments of the present invention are defined by the appended claims.

DETAILED DESCRIPTION

A classical pair of glasses as known in the art is illustrated from different points of view in FIGS. 1A to 1E.

It comprises two glasses 1, a frame (or rim) 2, a pair of folding arms 3 mounted on the frame via a hinge 5.

Figures 1A, 1B, 1C, 1D, 1F:
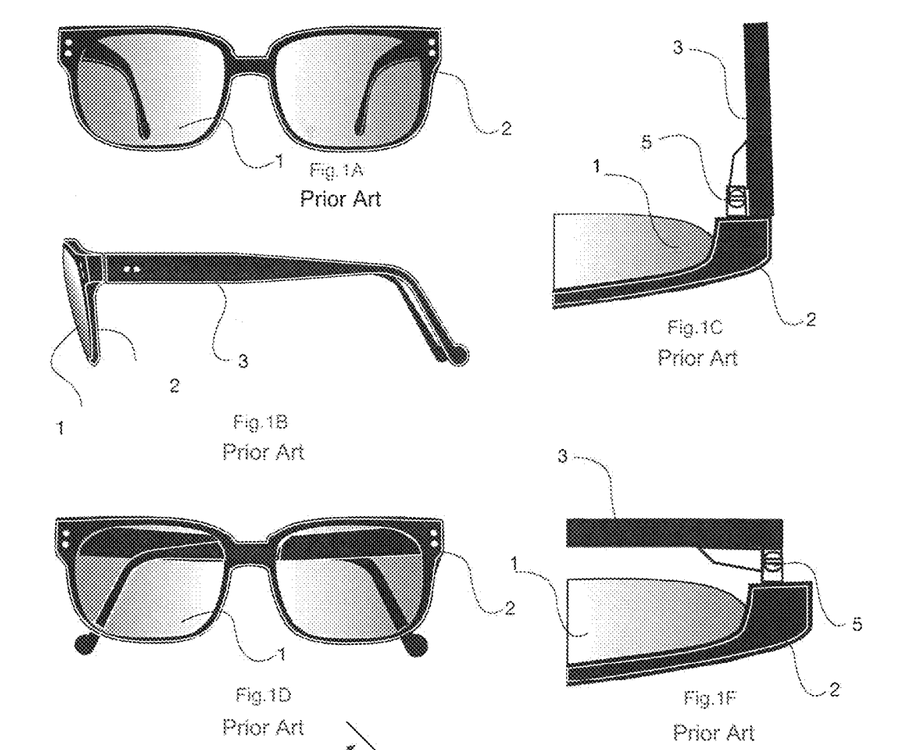
FIGS. 1A to 1F illustrate typical glasses of the prior art seen from different sides and positions.
Figure 1E:
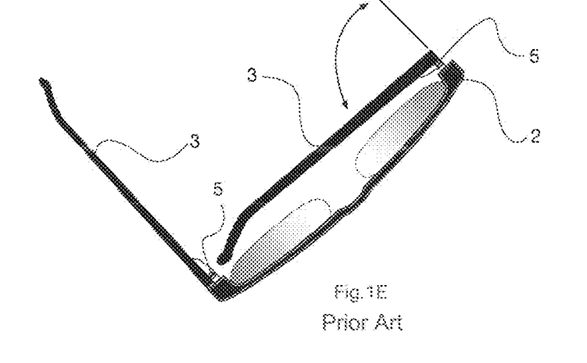

FIGS. 1A to 1C illustrate the glasses with unfolded arms 3 and FIGS. 1D, 1F with folded arms 3. FIG. 1E illustrates the glasses with one folded arm 3 and one unfolded arm 3.

In the following description, same elements of the invention will be identified by the same or similar numerical references.

FIGS. 2A to 2F illustrate a first embodiment of the present invention.

According to said first embodiment, the glasses/spectacles comprise at least a pair of glasses 1 mounted in a frame 20 and a pair of arms 30 attached to the frame 20 via hinge units 50, 50a. The glasses further comprise a top bar 60 that is laterally movable on the frame 20 as illustrated by the arrows (to the left in FIGS. 2A, 2C or to the right as in FIGS. 2D, 2F, or FIG. 2E).

Figures 2A, 2B, 2C:
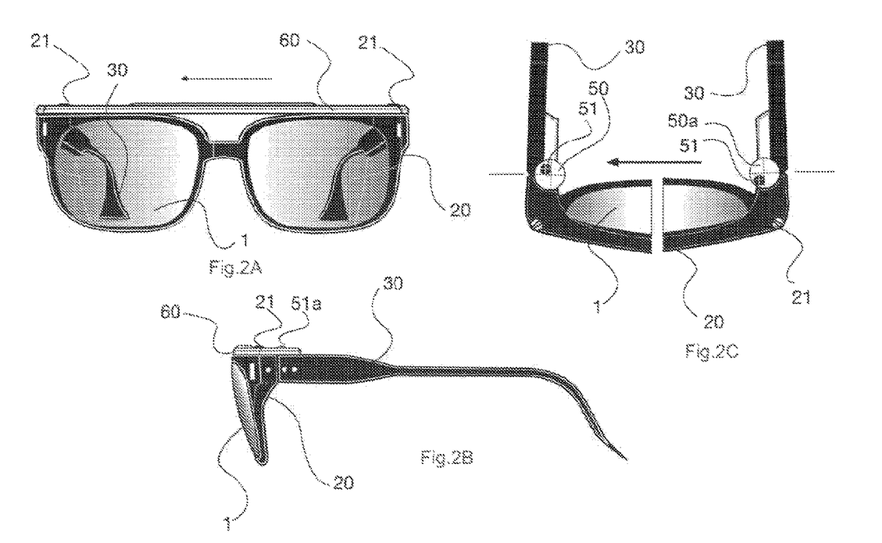
FIGS. 2A to 2F illustrate an embodiment of the glasses according to the present invention seen from different sides and positions.
Figure 2D:
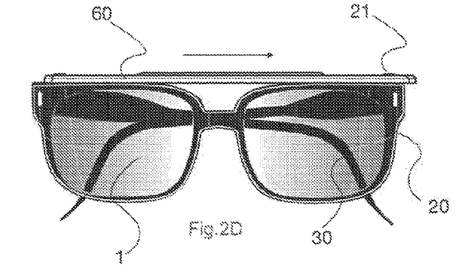
Figure 2E:
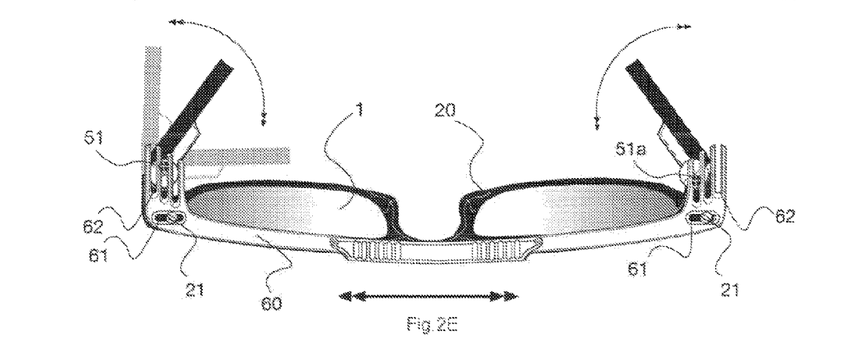

As will be further explained hereunder, the movement of the bar 60 allows the folding or unfolding of the arms 30 as desired by the user. To this effect, the bar 60 is mounted in a slidable manner in a lateral direction, as indicated by the arrows of FIG. 2E.

Figure 2F:
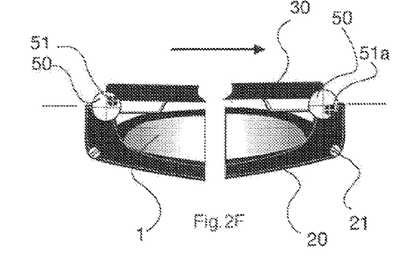

More precisely, the bar 60 comprises at least two sliding grooves 61 which allow its mounting on the frame 20 of the glasses through screws 21 and its lateral movement to the right and to the left. Each end of the bar 60 comprises at least one elastic spring groove 62 which cooperates with a corresponding off-centered fixation 51 (for example a pin) which is mounted on each hinge 50 (see FIGS. 2E and 2F). As will readily be understood from a skilled person, the cooperation of the off-centered fixations 51 with the grooves 62 will impart a rotational movement to the arms 30 around the hinge axis, when the bar 60 is moved laterally to the right or to the left. This effect is illustrated in FIG. 2E where a movement to the right of the bar 60 will fold the arms 30 (the result is illustrated in FIGS. 2D and 2F) and where a movement to the left of the bar 60 will unfold the arms (the result is illustrated in FIGS. 2A-2C).

Preferably, the grooves 62 have a spring effect that results in a smooth folding and unfolding of the arms 30.

Figure 3A:
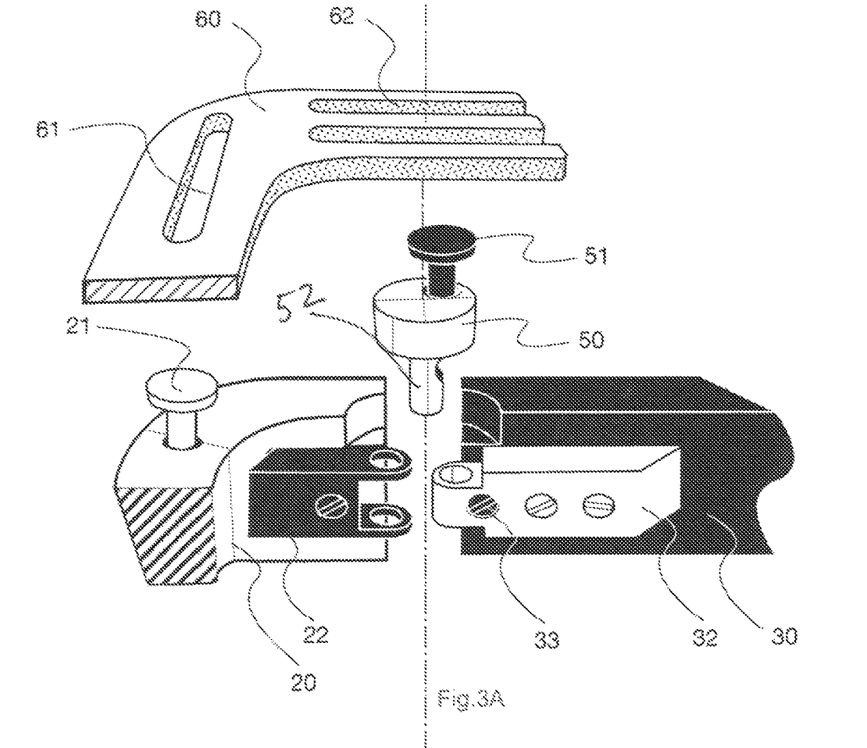
FIGS. 3A and 3B illustrate details of the hinge mechanism according to an embodiment of the present invention.
Figure 3B:
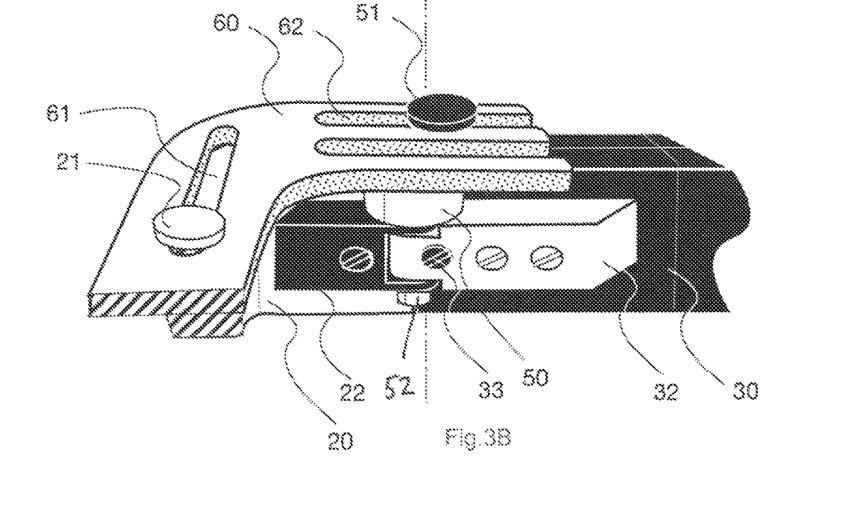

The hinge mechanism connecting the arms 30 to the frame 20 is illustrated in more details in FIGS. 3A and 3B. It comprises a frame hinge part 22 attached to the frame 20 and an arm hinge part 32 attached to the arm 30. Both parts 22, 32 cooperate together to form the hinge and are attached by a main axis 52 of the hinge unit 50. The unit 50 is fixedly attached to the hinge parts for example by the blocking screw 33. each hinge unit 50 further comprises a second actuating axis 51 which is off-centered with respect to the main axis 52 for transforming the straight lateral displacement of the bar 60 into a rotational movement of the arms 30 in accordance with the principles of the present invention.

FIG. 3B illustrate the same parts as FIG. 3A in a mounted state with the second actuating axis 51 taken in the groove 62 of the bar 60, said bar 60 being fixed to the frame 20 via an attachment means 21.

Figure 4A:
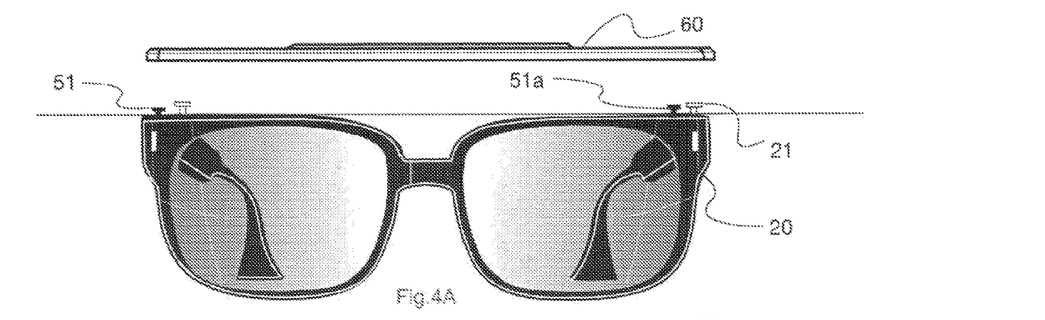
FIGS. 4A to 4D illustrate front and top views of an embodiment of the present invention in un-mounted and mounted states.

FIGS. 4A to 4D illustrate front and top views of an embodiment of the present invention in un-mounted and mounted states. Specifically, FIG. 4A illustrates an exploded front view of the glasses with the frame being separated from bar 60, FIG. 4B being the same but in a top view.

Figure 4B:
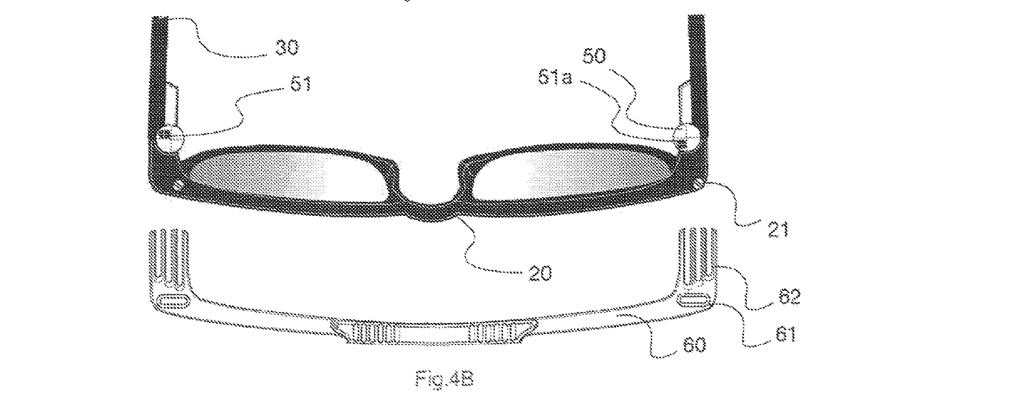
Figure 4C:
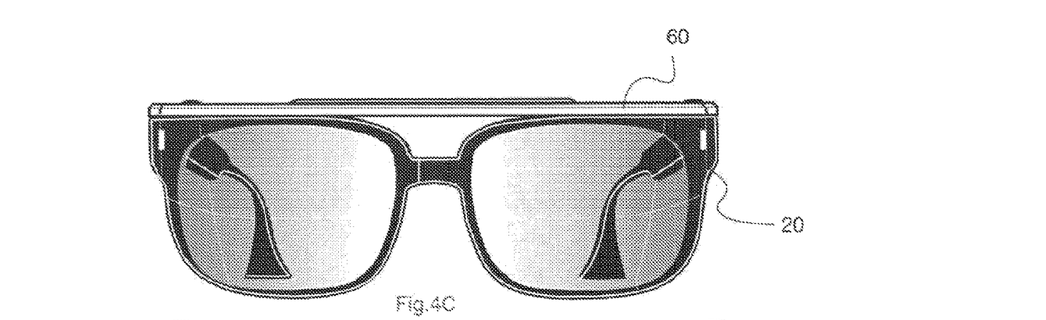
Figure 4D:
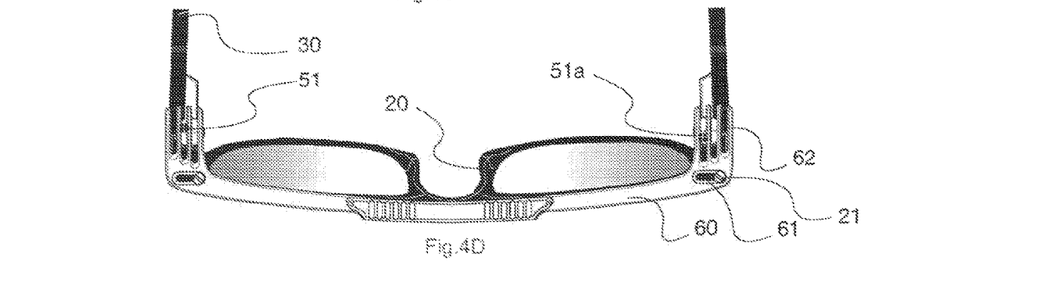

FIGS. 4C and 4D illustrate the same glasses, this time in a mounted state (front view FIG. 4C, top view FIG. 4D).

Figure 5A:
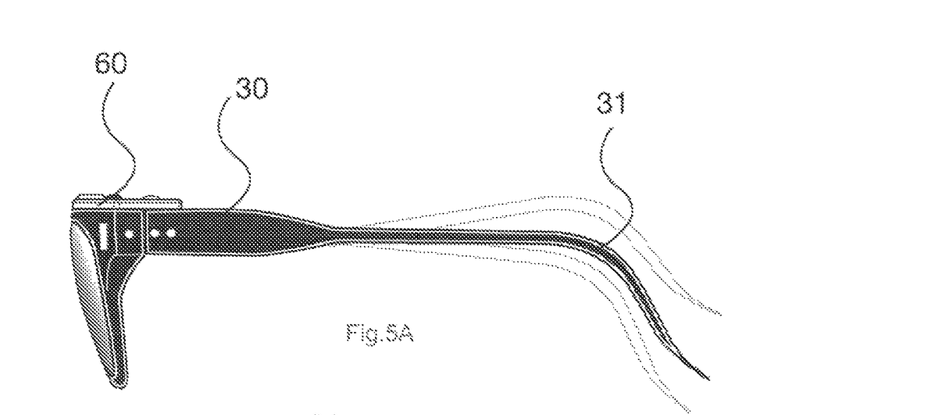
FIG. 5A illustrates the flexibility of the arms of an embodiment of the present invention.

FIG. 5A illustrates the preferred flexibility of the arm ends 31 of an embodiment of the present invention.

Figure 5B:
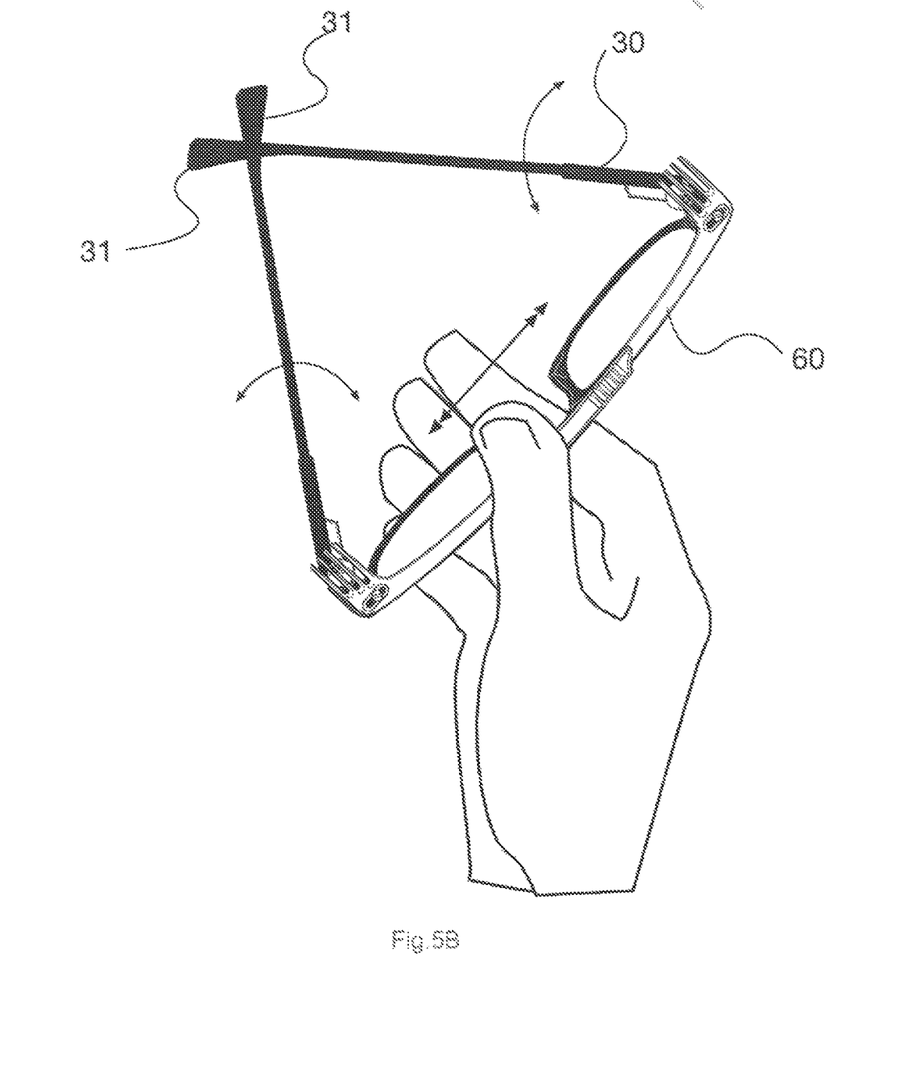
FIG. 5B illustrates the functioning of the principle of the present invention.

FIG. 5B illustrates the functioning of the principle of the present invention with the hand of a user manipulating the glasses of the present invention and moving the bar 60 laterally in one direction or the other to fold or unfold the arms of the glasses. In order for the arm ends 31 not to collide and render the folding impossible, it is important that the arms 30 are not displaced at the same time but rather that one arm is moved with a small delay with respect to the other arm. This can be done by the choosing of a different off-centering for each hinge (different distance between the main axis 52 and actuating axis 51/51a of each hinge unit 50 so that one arm 30 moves "faster" than the other. Other equivalent technical means may of course be chosen to fulfil the same effect.

Figure 6A:
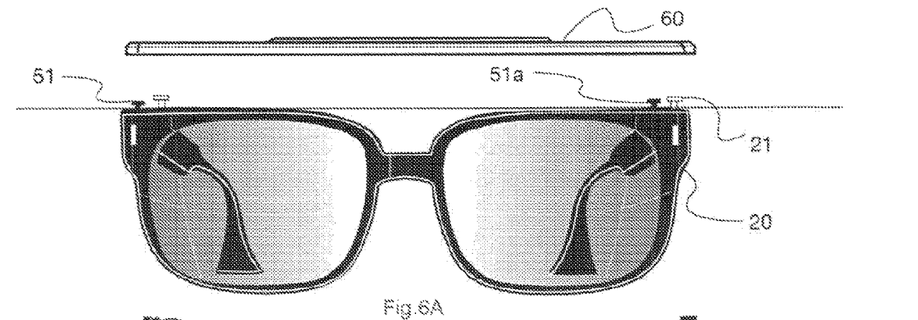
FIGS. 6A to 6D illustrate another embodiment of the present invention.
Figure 6B:
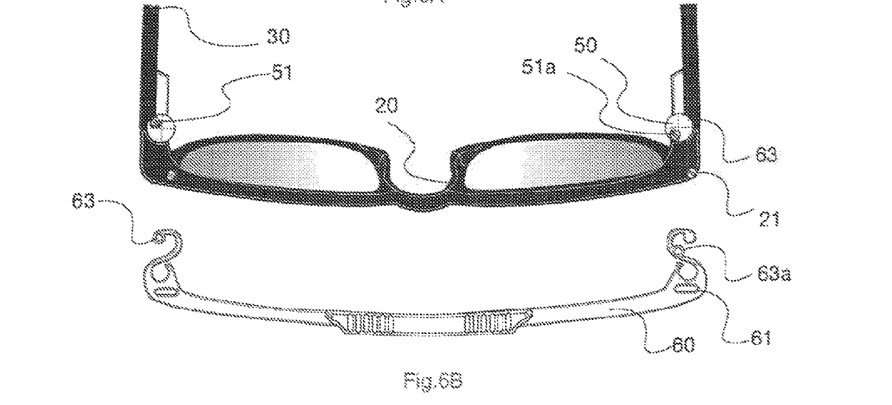
Figure 6C:
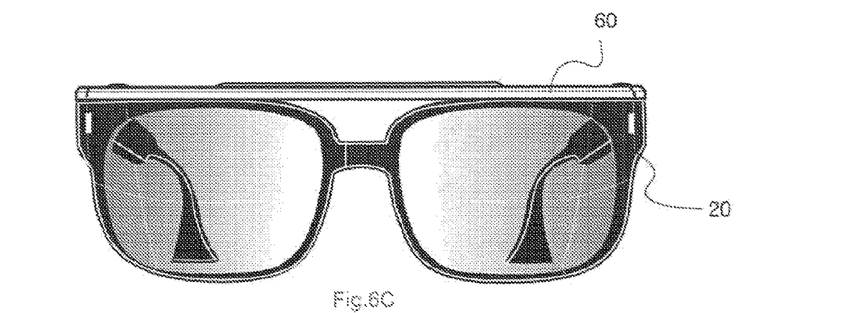
Figure 6D:
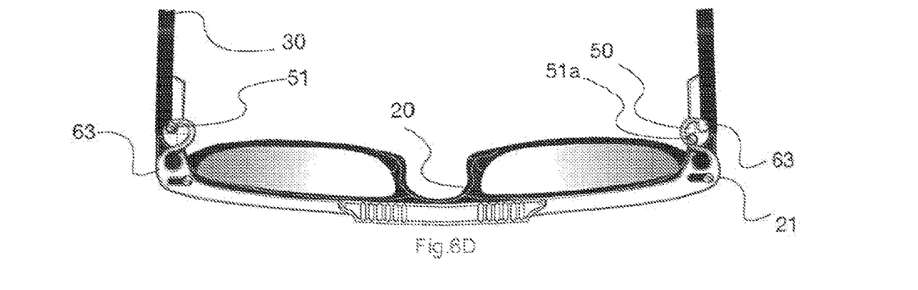

FIGS. 6A to 6D illustrate another embodiment of the present invention. In this embodiment, the main difference with respect to the other embodiment of the preceding drawings resides in the shape of the springs 63, 63a of the bar 60 and in the fact that they are fixed to the actuating axis 51/51a whereas in the embodiment described previously, the actuating axis 51/51a were movable with respect to the springs in the grooves 62. FIG. 6A illustrates a front view and FIG. 6B illustrates a top view of the glasses and the bar 60 which are separated from each other and FIGS. 6C, 6D illustrate the same views but in a mounted state. The description made above for preceding embodiments applies correspondingly here for the same parts.

As illustrated in FIGS. 6B and 6D, the springs 63, 63a have an "S" shape and are connected to the hinge actuating axis 51, 51a, see FIG. 6D which shows the glasses and the bar 60 in a mounted state, for example via a screw or other equivalent means (for example by force-fitting).

As in FIG. 4B, FIG. 6B also shows the off-centering of the actuating axis 51/51a with respect to the main axis 52 of each hinge unit 50.

This embodiment of FIGS. 6A-6D functions in the way illustrated in FIG. 5B as well and a single hand operation allows folding and unfolding of the arms 30. An advantage of this embodiment and of the springs 63 is that they provide a stable position of the arms in the unfolded state and also in the folded state.

Figure 7A:
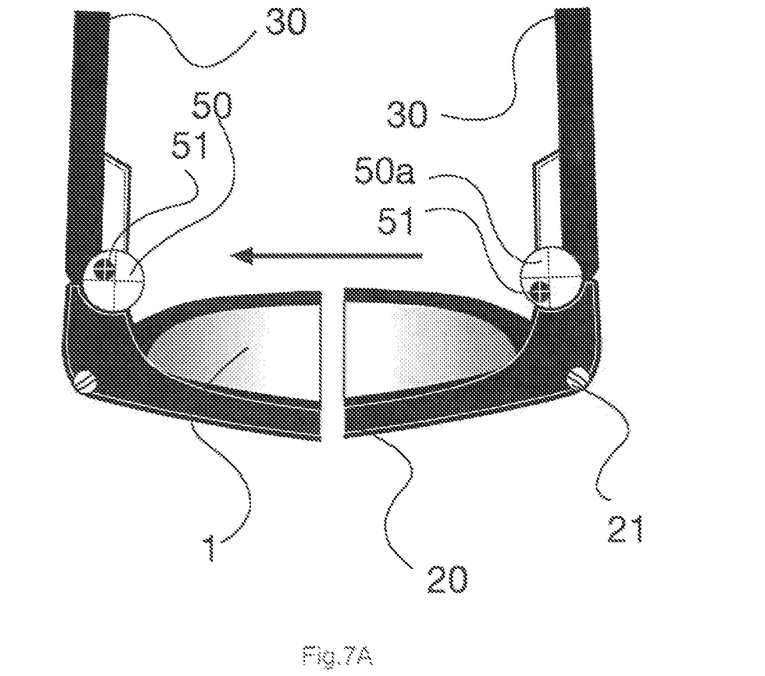
FIGS. 7A and 7B illustrate a functioning detail of the present invention.
Figure 7B:
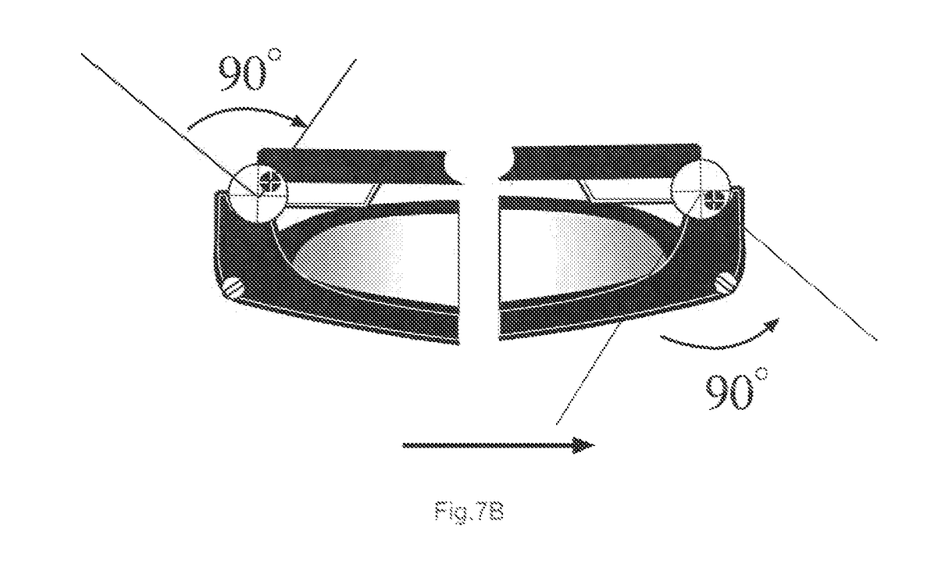

FIGS. 7A and 7B illustrate the approximate 90° rotation of each hinge unit 50 when moving from an unfolded state (FIG. 7A) to a folded state (FIG. 7B) of the arms 30.

FIGS. 8A to 8F illustrate a further embodiment of the present invention.

According to said further embodiment, the glasses/spectacles comprise at least a pair of glasses 1 mounted in a frame 120 and a pair of arms 130 attached to the frame 120 via hinge units 150. The glasses further comprise an actuating frame 160 that is laterally movable on the frame 120, compare FIGS. 8B and 8E (moved to the right in this figure).

Figure 8A:
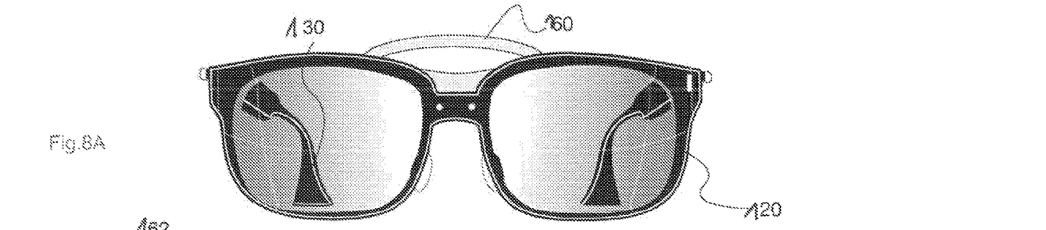
FIGS. 8A to 8F illustrate another embodiment of the glasses according to the present invention seen from front and top sides in different positions.
Figures 8B, 8C:
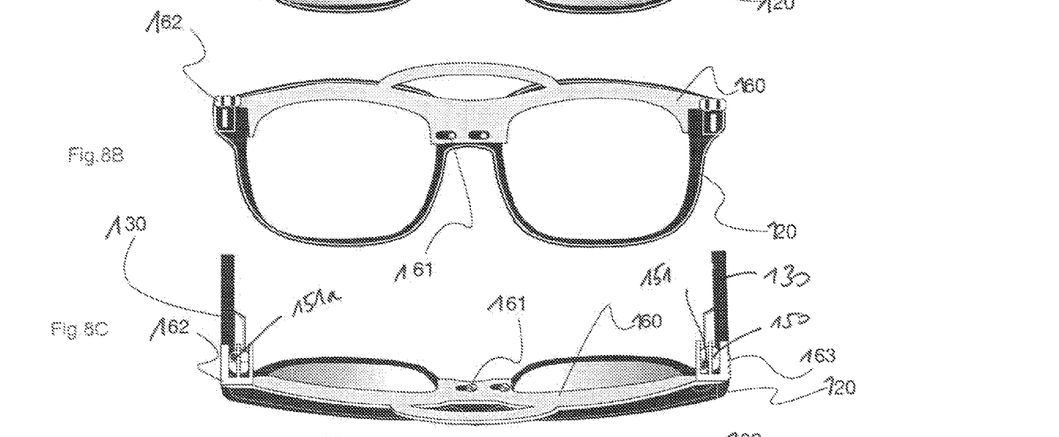
Figures 8D, 8E, 8F:
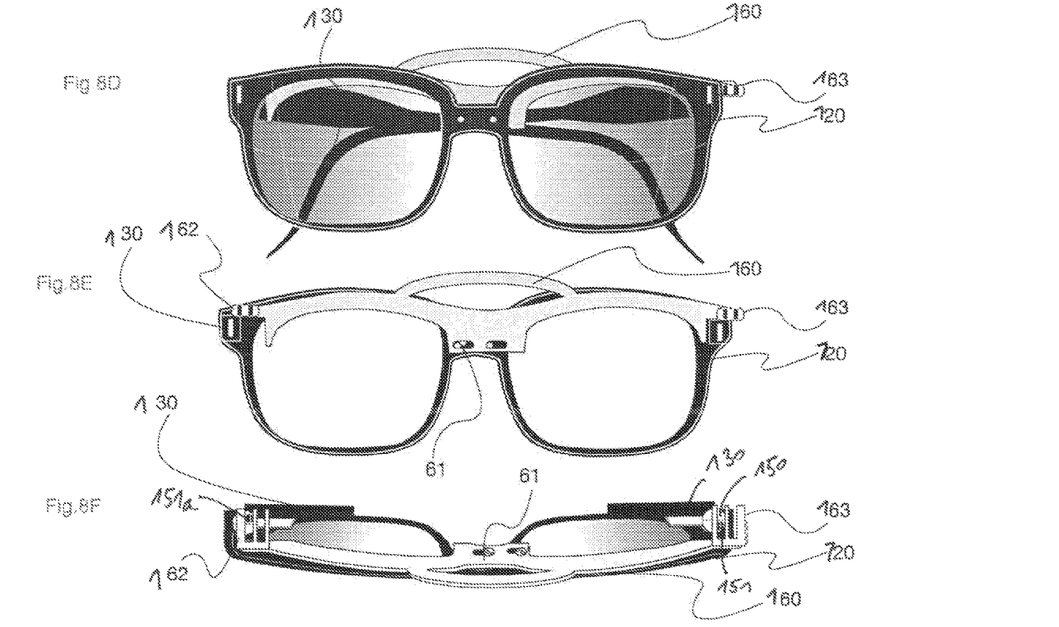
Figure 9A:
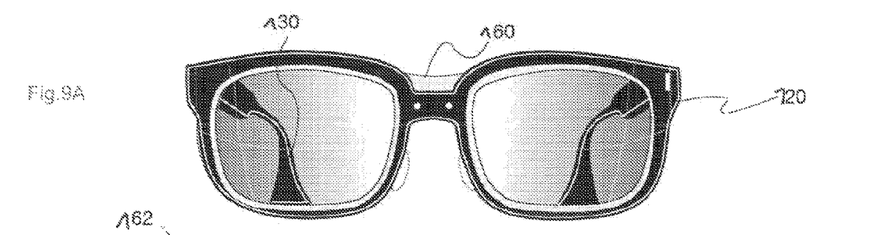
FIGS. 9A to 9F illustrate another embodiment of the glasses according to the present invention seen from front and top sides in different positions.
Figures 9B, 9C:
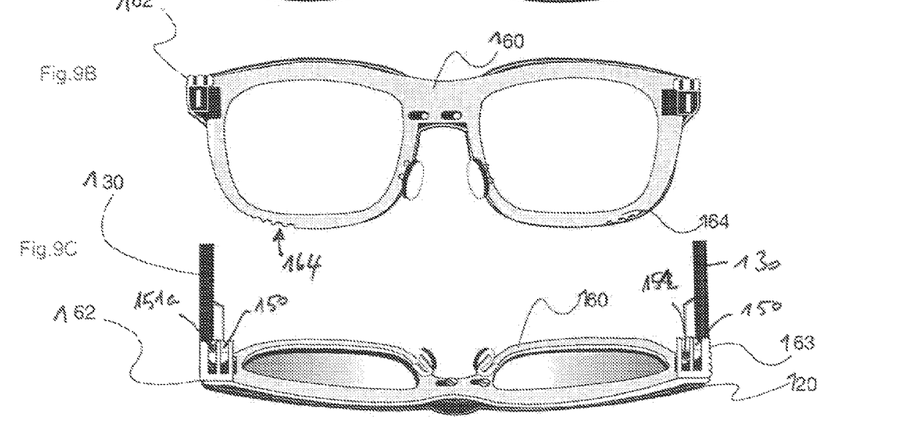
Figures 9D, 9E, 9F:
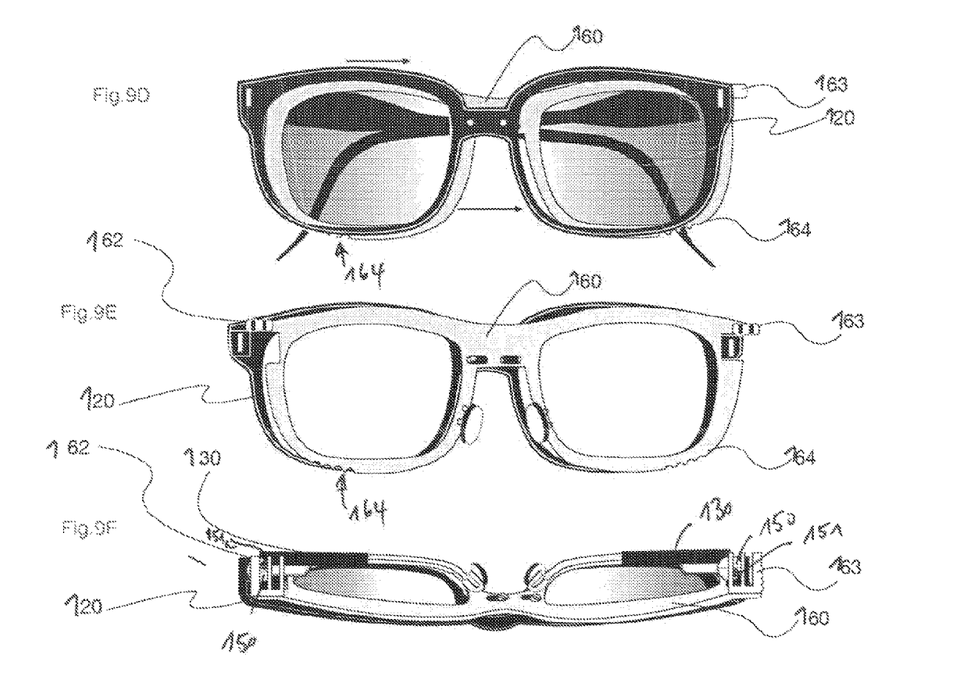

As will be further explained hereunder, the movement of the actuating frame 160 allows the folding or unfolding of the arms 130 as desired by the user. To this effect, the bar 160 is mounted in a slidable manner in a lateral direction, as illustrated in the FIGS. 8B/8E).

More precisely, the actuating frame 160 comprises at least two sliding grooves 161 which allow its mounting on the frame 120 of the glasses through screws or other equivalent supports and its lateral movement to the right and to the left. Each end of the actuating frame 160 comprises at least one groove 162 (elastic or not) which cooperates with a corresponding off-centered fixation (for example a pin 151, 1511a) which is mounted on each hinge 150 actuating an arm 130. As will readily be understood from a skilled person and as described above in relation to preceding embodiments, the cooperation of the off-centered fixations 151/151a of hinges 150 with the grooves 162 will impart a rotational movement to the arms 130 around the hinge axis, when the actuating frame 160 is moved laterally to the right or to the left. This effect is illustrated in FIG. 8E where a movement to the right of the actuating frame 160 will fold the arms 130 (the result is illustrated in FIG. 8F) and where a movement to the left of the bar 160 will unfold the arms (the result is illustrated in FIG. 8C).

Preferably, the grooves 162 have a spring effect that results in a smooth folding and unfolding of the arms 130.

FIGS. 9A to 9F illustrate a further embodiment of the invention. One of the differences with respect to the embodiment of FIGS. 8A to 8F resides in the shape of the actuating frame 160. In this embodiment, the actuating frame has a shape similar to the shape of the glasses themselves, but the principle is the same for folding the arms 130. The rest of the description above applies mutatis mutandis to the present embodiment.

References 163 and 164 identify zones comprising serrations or grooves to help the manipulation of the glasses of the present invention.

FIGS. 10A to 10F illustrate the operation (opening or closing/folding and unfolding) of the arms 130 of glasses of several embodiments of the present invention with one hand by rotation of the arms 130 around the main axis 152 of the hinges 150.

Figure 10A:
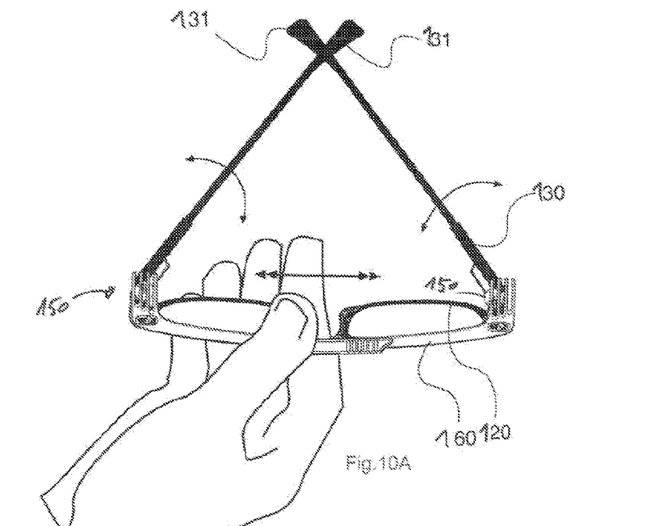
FIGS. 10A to 10F illustrate the operation (opening or closing) of the arms of glasses of several embodiments of the present invention with one hand.
Figure 10B:
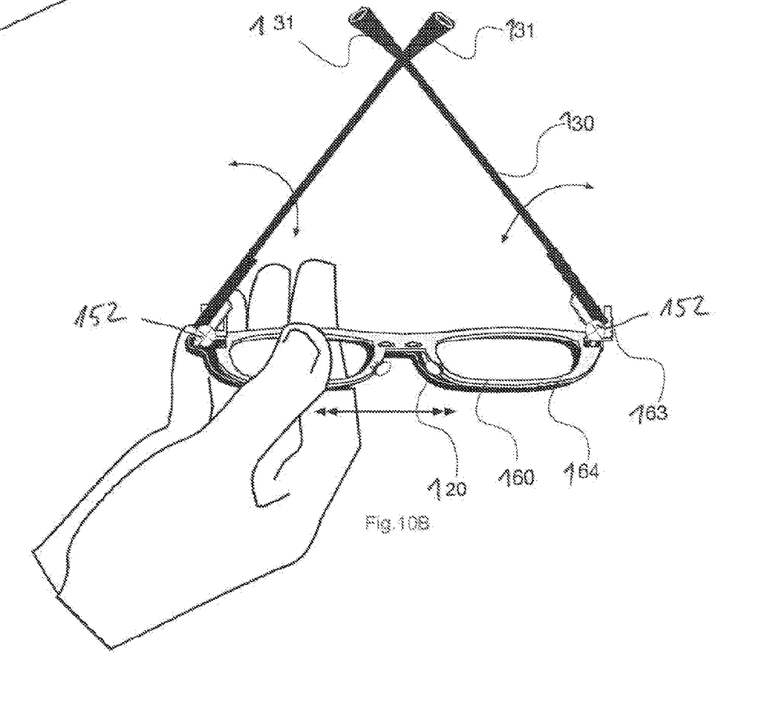

For example in FIGS. 10A and 10B, the actuating frame 160 is operated from the top by the thumb of a user or from the bottom (FIG. 10B), on the serrations 164.

Figure 10C:
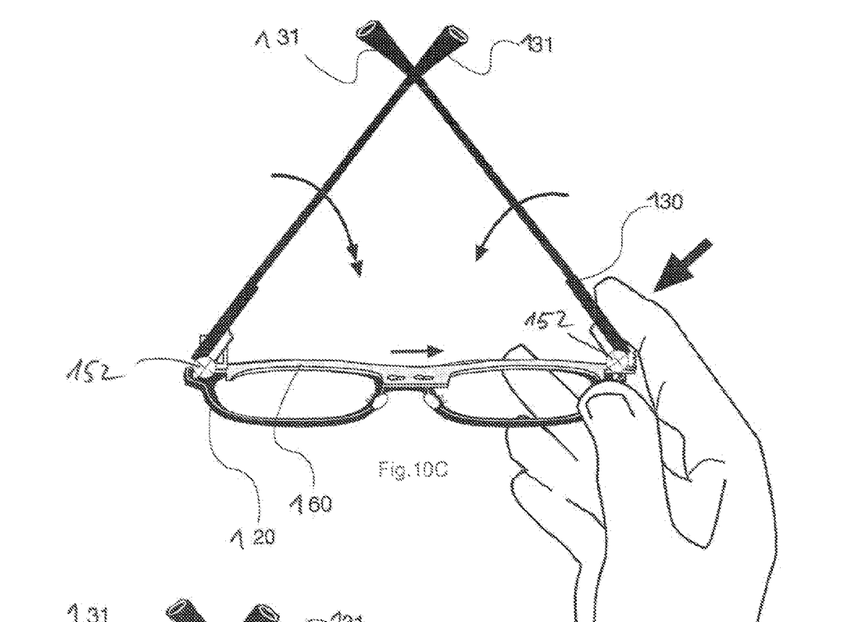
Figure 10D:
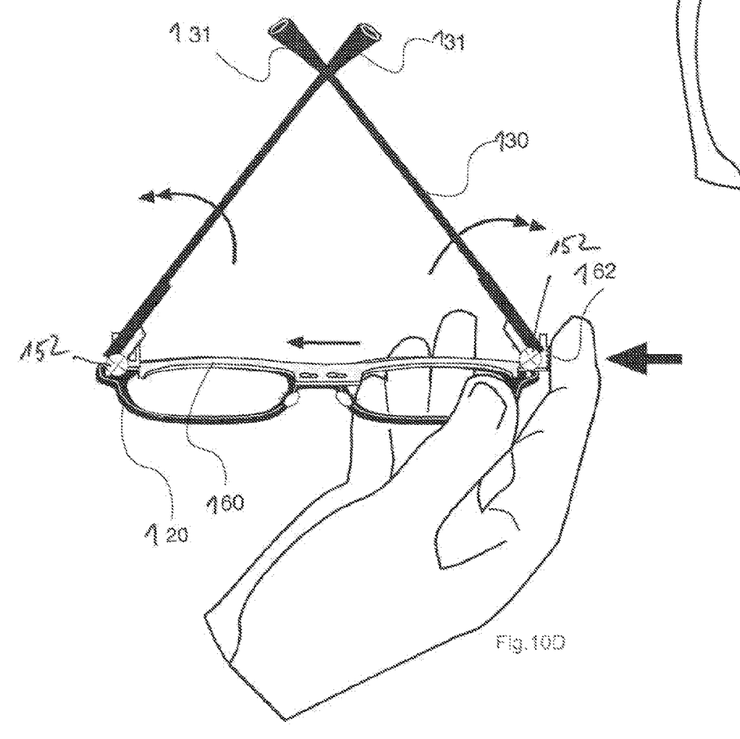

For example in FIGS. 10C and 10D, the actuating frame 160 is operated from the side by the index finger of a user, on the serrations 163. Specifically, in FIG. 10C, by pushing on one arm 130, the arm ends 131 move towards each other by the side movement to the right of actuating frame 160 (see the arrow in FIG. 10C) and the arms move toward a closed/folded positions (see the arrows over the arms 130). In FIG. 10D, by pressing on the side of the actuating frame 160 (on the serrations 163 for example), the actuating frame is moved to the left (see the arrow over the frame 160) and the arms are deployed/unfolded by this lateral movement of the frame 160.

Figures 10E, 10F:
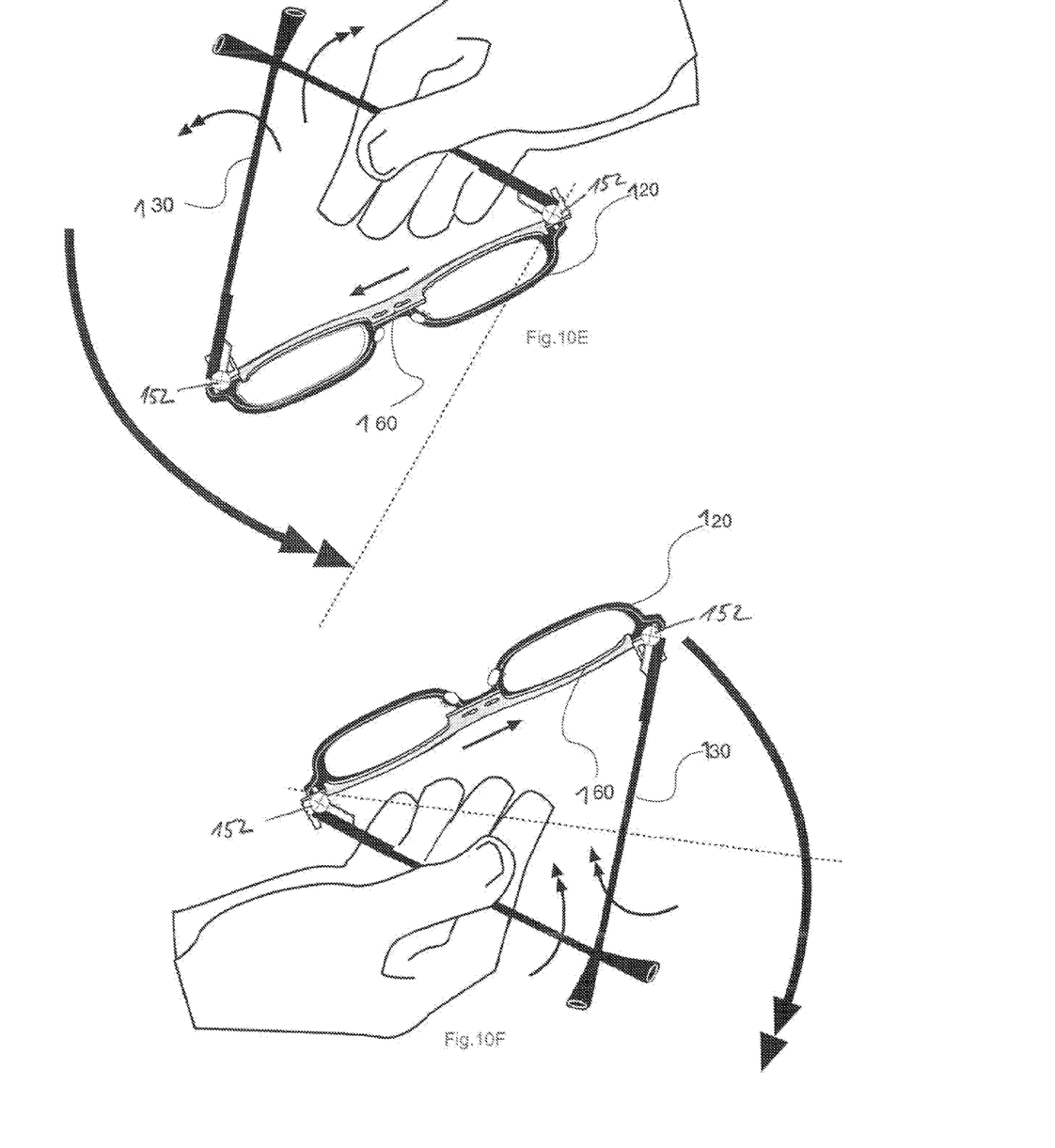

FIGS. 10E and 10F illustrates another way of opening or closing (folding-unfolding) the arms of the glasses of the present invention using gravity. In this case, one arm 130 of the glasses is held by a user and the position of the glasses determined if the arms 130 are opened or closed. In FIG. 10E, there is shown the opening of the arms 130 by the glasses moving downward (see the arrow in FIG. 10E) and in FIG. 10F, there is shown the closing of the arms 130 (see the arrow in FIG. 10F), the opening or the closing being determined by the relative position of the glasses with respect to the hand of the user: in FIG. 10E, the frame 120 of the glasses moves away from the arm 130 thereby pushing the actuating frame 160 to the right (see the arrow over the frame 160) which has the effect of deploying/unfolding the second arm in accordance with the principles of the present invention.

In FIG. 10F, the frame 120 moves toward the held arm 130 which pushes the frame 160 in the other direction, thus closing/folding the other arm 130 as well.

The examples given in the present specification are only for illustrative purposes and should not be construed in a limiting manner. Other constructions are possible using equivalent means and within the spirit and scope of the present invention. The different embodiments and their technical features may be combined between them according to circumstances.

For example, actuating frame may have any desired shape to fulfil its desired functions: as illustrated in the drawings (bar or frame) or another shape, the idea being to have a part moving relatively to the glass frame to act on the arms 30/130 (for example at the hinge level) in order to move the arms in different positions with respect to the frame, typically from an open position to a closed position and vice-versa.

Also the principles of the invention are applicable to any type of glasses: spectacles, sunglasses, viewing aid glasses etc.

The different parts of the invention may be realized in any appropriate material: such as metals, precious metals, plastics, synthetic materials etc. or any combination thereof.

The invention claimed is:

1. Glasses comprising:
   a frame;
   two hinge units;
   two arms that are mounted on the frame articulated via the corresponding hinge unit, each hinge unit including a hinge main axis around which the corresponding arm rotates relative to the frame, and a hinge actuating axis off-centered relative to the hinge main axis; and
   a movable element mounted on the frame for a lateral displacement of the movable element relative to the frame,
   wherein each end of the movable element includes a groove that is arranged perpendicular to a direction of the lateral displacement of the movable element, each hinge actuating axis having a pin engaging with a corresponding groove of the respective end of the movable element, such that the lateral displacement of the movable element in a first direction folds the two arms and moves each pin within the corresponding groove, and the lateral displacement of the movable element in a second direction unfolds the two arms and moves each pin within the corresponding groove.

2. The glasses as defined in claim 1, wherein the movable element is a bar or an actuating frame slidably mounted to the frame.

3. The glasses as defined in claim 1, wherein the lateral displacement of the movable element relative to the frame imparts a rotational movement to the hinge unit via the pin of the hinge actuating axis, leading to the two arms being folded or unfolded.

4. The glasses as defined in claim 1, wherein each groove is formed by an elastic element at each end of the movable element that extends perpendicularly to the direction of the lateral displacement.

5. The glasses as defined in claim 1, further comprising:
   at least two attachment means for slidably attaching the movable element to the frame, the frame having at least two additional grooves,
   wherein the at least two attachment means are arranged in the at least two additional grooves, respectively, such that the at least two additional grooves are configured to slide relative to the at least two attachment means upon the lateral displacement of the movable element relative to the frame.

6. The glasses as defined in claim 5, wherein the attachment means includes a screw.

7. The glasses as defined in claim 1, wherein each hinge unit is attached to the respective arm via a blocking screw to block a rotation of the hinge unit relative to the respective arm.

8. The glasses as defined in claim 7, wherein the blocking screw engages with the hinge main axis.

* * * * *